US005663241A

United States Patent [19]

Takamatsu et al.

[11] Patent Number: 5,663,241
[45] Date of Patent: Sep. 2, 1997

[54] REMOVABLE PRESSURE SENSITIVE ADHESIVE AND ARTICLE

[75] Inventors: Yorinobu Takamatsu; Kengo Imamura, both of Sagamihara, Japan; Richard J. Goetz, Woodbury, Minn.

[73] Assignee: Minnesota Mining and Manufacturing Company, St. Paul, Minn.

[21] Appl. No.: 354,644

[22] Filed: Dec. 13, 1994

[51] Int. Cl.$^6$ .................................................. C09J 123/26
[52] U.S. Cl. .................. 525/328.6; 525/328.7; 525/328.2; 525/376; 576/304; 576/315; 428/355 AK; 427/208.4
[58] Field of Search .................. 525/328.2, 328.6, 525/328.7, 376; 526/304, 315; 438/355; 427/208.4

[56] References Cited

U.S. PATENT DOCUMENTS

| | | | |
|---|---|---|---|
| 3,345,336 | 10/1967 | Kuhlkamp et al. | 260/63 |
| 3,691,140 | 9/1972 | Silver | 260/78.5 |
| 3,857,731 | 12/1974 | Merrill, Jr. et al. | 117/112 PA |
| 3,959,224 | 5/1976 | Coleman | 526/304 |
| 4,166,152 | 8/1979 | Baker et al. | 428/522 |
| 4,250,070 | 2/1981 | Ley et al. | 524/555 |
| 4,267,091 | 5/1981 | Geelhaar et al. | 260/29.6 TA |
| 4,495,318 | 1/1985 | Howard | 524/375 |
| 4,529,772 | 7/1985 | Druschke et al. | 524/555 |
| 4,598,112 | 7/1986 | Howard | 524/78 |
| 4,636,432 | 1/1987 | Shibano et al. | 428/327 |
| 4,645,783 | 2/1987 | Kinoshita | 523/221 |
| 4,647,504 | 3/1987 | Kimimura et al. | 428/327 |
| 4,656,218 | 4/1987 | Kinoshita | 524/460 |
| 4,786,696 | 11/1988 | Bohnel | 526/88 |
| 4,931,494 | 6/1990 | Auchter et al. | 524/460 |
| 4,959,428 | 9/1990 | Abe et al. | 526/201 |
| 4,988,567 | 1/1991 | Delgado | 428/402 |
| 4,994,322 | 2/1991 | Delgado et al. | 428/343 |
| 5,045,569 | 9/1991 | Delgado et al. | 521/60 |
| 5,118,750 | 6/1992 | Silver et al. | 524/462 |
| 5,266,402 | 11/1993 | Delgado et al. | 428/355 |
| 5,268,417 | 12/1993 | Filges et al. | 524/714 |

FOREIGN PATENT DOCUMENTS

| | | | |
|---|---|---|---|
| 0 209 337 | 1/1987 | European Pat. Off. | C09J 3/00 |
| 0 246 848 | 11/1987 | European Pat. Off. | C09J 3/14 |
| 0 567 128 | 10/1993 | European Pat. Off. | C09D 17/00 |
| 26 34 956 A1 | 2/1978 | Germany | C09J 5/06 |
| 3544882A1 | 6/1987 | Germany . | |
| WO 93/13147 | 7/1993 | WIPO | C08F 220/18 |

*Primary Examiner*—Mark Nagumo
*Attorney, Agent, or Firm*—Gary L. Griswold; Walter N. Kirn; Steven E. Skolnick

[57] ABSTRACT

A removable pressure sensitive adhesive comprises pressure sensitive adhesive microparticles that are the polymerization product of a mono-olefinically unsaturated monomer having an aldehyde group or a ketone group, and a base monomer. By the addition of a polyhydrazide, other adhesives with improved properties can be provided.

33 Claims, No Drawings

REMOVABLE PRESSURE SENSITIVE ADHESIVE AND ARTICLE

BACKGROUND OF THE INVENTION

1. Field of the Invention

In general, this invention relates to removable pressure sensitive adhesives and articles made therewith. This invention further relates to removable pressure sensitive adhesives and articles that have excellent shear strength, demonstrate reduced adhesive transfer to a substrate, and are solvent resistant.

2. Description of the Related Art

Inherently tacky, elastomeric microspheres are known to be useful in repositionable pressure sensitive adhesives. Numerous references describe the preparation and/or use of solid, inherently tacky repositionable or reusable microsphere-based adhesives. Ideally, these adhesives can be repeatedly adhered to and removed from a substrate without substantial loss of adhesion capacity. See, for example, U.S. Pat. Nos. 3,691,140 (Silver); 4,166,152 (Baker et al.); 4,495,318 (Howard); 4,598,112 (Howard); and 4,786,696 (Bohnel). Reportedly, "the primary problem associated with these types of adhesives have been microsphere loss, i.e., microsphere transfer to the substrate." (See, for example, U.S. Pat. No. 4,994,322 (Delgado et al.))

There have been prior attempts to solve the problem of "microsphere loss." The typical approaches have been to use a binder, a primer, an adhesion promoting monomer, or other materials that reduce adhesive transfer. U.S. Pat. No. 3,857,731, (Merrill et al.); EPA 0209337 (Thomson et al.); DE 3,544,882 A1 (Nichiban); U.S. Pat. No. 4,656,218 (Kinoshita); U.S. Pat. No. 4,645,783 (Kinoshita); and U.S. Pat. No. 5,118,750 (Silver et al.) are representative of these approaches.

Other attempts to attack the problem of microsphere transfer focus on the use of hollow, inherently tacky microspheres as described in U.S. Pat. Nos. 4,988,567 (Delgado) and 5,045,569 (Delgado). Hollow microspheres have also been combined with binders to further reduce adhesive transfer. See, for example, U.S. Pat. No. 4,994,322 (Delgado et al.).

However, a need still exists for removable pressure-sensitive adhesives that demonstrate reduced adhesive transfer without the use of binders.

Many of the foregoing patents describe the resulting microspheres as solvent insoluble and solvent dispersible. See, for example, U.S. Pat. Nos. 3,691,140 (Silver); 4,166,152 (Baker et al.); 4,786,696 (Bohnel); 4,988,567 (Delgado); 4,994,322 (Delgado et al.); 5,045,569 (Delgado); and 5,118,750 (Silver et al.). The microspheres do not dissolve in solvent but will disperse in the solvent. Consequently, an article prepared from these adhesives, such as a tape, could be susceptible to solvent attack since the microspheres would disperse in the solvent. There are many applications for which a removable pressure sensitive adhesive would benefit from also being solvent resistant, such as spray painting operations and bonding to oily substrates. There is especially a need for removable pressure sensitive adhesives that are resistant to non-polar organic solvents.

SUMMARY OF THE INVENTION

In general, this invention relates to removable pressure sensitive adhesives. In one broad embodiment, the invention is for a removable pressure sensitive adhesive comprising pressure sensitive adhesive microparticles that are the polymerization product of a mono-olefinically unsaturated monomer having an aldehyde group or a ketone group (sometimes referred to herein as the carbonyl monomer), and a base monomer.

The mono-olefinic unsaturation in the carbonyl monomer may be provided by (meth)acrylate, (meth)acrylamide or styryl functionality. Examples of suitable carbonyl monomers include acrolein, vinyl methyl ketone, vinyl ethyl ketone, vinyl isobutyl ketone, diacetone (meth)acrylamide, formylstyrol, diacetone (meth)acrylate, acetonyl acrylate, 2-hydroxypropyl acrylate-acetyl acetate, 1,4-butanediol acrylate acetylacetate, and mixtures thereof.

Preferably, the base monomer is an alkyl (meth)acrylate ester, a vinyl ester, or mixtures thereof. More preferred base monomers are monofunctional unsaturated (meth)acrylate esters of non-tertiary alkyl alcohols, the alkyl groups of which have from 4 to 14 carbon atoms (most preferably from 4 to 10 carbon atoms).

The adhesive microparticles may optionally include a polar monomer that is copolymerizable with the carbonyl monomer and the base monomer. The microparticles may further include a multifunctional free-radically polymerizable crosslinking agent for internally crosslinking the microparticles.

Advantageously, it has been found that by adding a polyhydrazide (i.e., a material containing more than one hydrazino moiety) to the microparticles, a removable pressure sensitive adhesive having excellent shear strength, reduced adhesive transfer, and improved solvent resistance (as measured by the indispersibility of the adhesive in solvent) can be provided. It is believed that the polyhydrazide externally (i.e., interpartically) crosslinks the microparticles together. Consequently, this invention also relates broadly to removable pressure sensitive adhesives that are solvent indispersible and removable pressure sensitive adhesives that are based on pressure sensitive adhesive microparticles that are crosslinked together.

Useful polyhydrazides have the general structure:

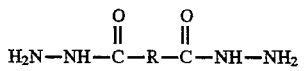

wherein R is an organic radical containing about 2 to 10 carbon atoms. Examples of suitable polyhydrazides include oxalyl dihydrazide, malonyl dihydrazide, succinyl dihydrazide, glutaryl dihydrazide, adipoyl dihydrazide, maleyl dihydrazide, sebacoyl dihydrazide, fumaroyl dihydrazide, isophthalic dihydrazide, terephthalic dihydrazide, and mixtures thereof.

In preferred embodiments, the pressure sensitive adhesives comprise:

(a) pressure sensitive adhesive microparticles that are the polymerization product of:
  (1) about 75 to 99.9 parts by weight (more preferably about 80 to 98 parts, most preferably about 85 to 98 parts) of a free-radically polymerizable monomer selected from the group consisting of alkyl (meth)acrylate esters, vinyl esters, and mixtures thereof;
  (2) about 0.1 to 10 parts by weight (more preferably about 0.5 to 7 parts, most preferably about 1 to 5 parts) of a mono-olefinically unsaturated monomer having an aldehyde group or a ketone group; and
  (3) optionally, 0 to about 20 parts by weight (more preferably 0 to about 15 parts, most preferably 0 to about 10 parts) of a polar monomer different than the carbonyl monomer and the base monomer;

wherein the sum of (a)(1)+(a)(2)+(a)(3) is 100 parts by weight; and (b) about 0.5 to 150 milliequivalents (meq) per 100 grams of microparticles (more preferably about 1 to 100 meq, most preferably about 2 to 50 meq) of a polyhydrazide crosslinking agent for crosslinking the adhesive microparticles together.

Various pressure sensitive adhesive articles can be prepared using the pressure sensitive adhesives of the invention including single coated tapes and sheet goods, double coated tapes and sheet goods, and transfer adhesive articles.

A variety of different methods may be used to prepare the pressure sensitive adhesives. In general, these methods involve aqueous suspension polymerizing the pressure sensitive adhesive microparticles and then adding to the aqueous suspension a crosslinking agent for crosslinking the microparticles together. The various pressure sensitive adhesive articles can be prepared by applying the aqueous suspension of microparticles and crosslinking agent to a backing to form a wet adhesive layer and then drying the wet adhesive. Once dried, the pressure sensitive adhesive microparticles are crosslinked together.

DETAILED DESCRIPTION OF THE PREFERRED EMBODIMENTS

In general, this invention relates to a removable pressure sensitive adhesive. By "removable" it is meant that once the adhesive has been firmly applied to a piece of paper, it can be removed without tearing the paper. Preferably, the adhesives of the invention are repositionable by which it is meant that they can be repeatedly firmly adhered to and removed from the paper substrate without tearing the paper and without substantial loss of adhesive capacity. Upon removal from the paper substrate, the adhesive still presents a relatively uncontaminated surface for reapplication to the paper substrate. By "pressure sensitive" it is meant that the adhesives of the invention are tacky to the touch at room temperature (e.g., about 20° to 22° C.), as can be readily determined by a finger tack test, and can easily form a useful adhesive bond with the application of light pressure.

In more preferred embodiments, the adhesives of the invention demonstrate little or no adhesive transfer. As a result, little or no adhesive remains on the substrate once the adhesive has been removed, thereby leaving a relatively uncontaminated substrate surface. Other advantages afforded by the preferred adhesives of the invention are excellent shear strength and solvent resistance, especially resistance to non-polar organic liquid solvents.

The removable pressure sensitive adhesives of the invention are based on polymeric, pressure sensitive adhesive microparticles. The microparticles comprise and, more preferably consist essentially of, the polymerization product of:
(a) a mono-olefinically unsaturated monomer that contains an aldehyde moiety or a ketone moiety (sometimes referred to herein as the "carbonyl monomer") and (b) a second or base monomer. In particularly preferred embodiments of the invention, the pressure sensitive adhesives further include a polyhydrazide. As explained in more detail below, it is believed that the polyhydrazide reacts with the carbonyl group on the carbonyl monomer to externally or interpartically crosslink the adhesive microparticles together, thereby enhancing the shear strength and solvent resistance of the pressure sensitive adhesive while reducing the amount of adhesive transfer.

Turning now to the specific components of the adhesive, the carbonyl monomer preferably has the following general structure:

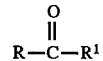

wherein R is an organic radical that is bonded to the carbonyl carbon atom by another carbon atom and contains a single, free-radically polymerizable carbon atom-to-carbon atom double bond. The mono-olefinic unsaturation may be provided by (meth)acrylate, (meth)acrylamide, styryl or other vinyl functionalities. Preferably it is provided by acrylate or acrylamide functionality. (The use of the term "meth" in parentheses indicates that, for example, both acrylate and methacrylate groups are contemplated.) $R^1$ is hydrogen or an organic radical that is bonded to the carbonyl carbon atom by another carbon atom. Both R and $R^1$ may contain any number of carbon atoms, may be aliphatic or aromatic, may be branched or linear, and may contain other functionalities such as ester or amide groups.

Examples of useful carbonyl monomers include acrolein, vinyl methyl ketone, vinyl ethyl ketone, vinyl isobutyl ketone, diacetone (meth)acrylamide, formylstyrol, diacetone (meth)acrylate, acetonyl acrylate, 2-hydroxypropyl acrylate-acetyl acetate, 1,4-butanediol acrylate acetylacetate, and mixtures thereof. Acrolein and diacetone acrylamide are particularly preferred.

In order to accommodate the preferred suspension polymerization manufacturing process for the adhesive microparticles (discussed below), the carbonyl monomer has at least some oil solubility, although it is preferred that it be both somewhat oil soluble and water soluble.

The carbonyl monomer is employed in an amount sufficient to provide good crosslinking of the microparticles to each other upon reaction with the polyhydrazide, while balancing shear strength, cohesive strength, storage modulus, pressure sensitive adhesion, and adhesive transfer. How these properties should be ultimately balanced will be determined in part by the intended use of the adhesive.

Within these parameters, the carbonyl monomer is typically used in an amount of about 0.1 to 10 parts by weight. If the carbonyl monomer provides less than about 0.1 part by weight, then the level of interparticle crosslinking tends to be insufficient resulting in adhesives having poor cohesive strength, low shear strength, and increased adhesive transfer. If the carbonyl monomer provides more than about 10 parts by weight, then the resulting polymer tends to be non-tacky and loses pressure sensitive adhesive properties, due to an increased storage modulus.

The base monomer is polymerizable with the carbonyl monomer, preferably free-radically polymerizable. The base monomers are oleophilic, water emulsifiable, and have limited water solubility so as to permit the formation of a stable suspension polymerizable system for manufacture of the adhesive microparticles. As homopolymers, base monomers generally have glass transition temperatures below about −10° C. to facilitate the provision of pressure sensitive adhesive properties.

Alkyl (meth)acrylate monomers may be used to provide the base monomer. Particularly preferred are monofunctional unsaturated (meth)acrylate esters of non-tertiary alkyl alcohols. The alkyl groups of these alcohols preferably contain from 4 to 14 (more preferably 4 to 10) carbon atoms. (Meth)acrylate esters prepared from alkyl alcohols having less than 4 or more than 14 carbon atoms tend to have inadequate pressure sensitive adhesive properties.

Examples of useful monomers include sec-butyl acrylate, n-butyl acrylate, isoamyl acrylate, 2-methylbutyl acrylate, 4-methyl-2-pentyl acrylate, 2-ethylhexyl acrylate, isooctyl acrylate, isononyl acrylate, isodecyl methacrylate, isodecyl acrylate, dodecyl acrylate, tetradecyl acrylate, and mixtures thereof. Particularly preferred are n-butyl acrylate, sec-butyl acrylate, isoamyl acrylate, 2-ethylhexyl acrylate, isooctyl acrylate, isononyl acrylate, isodecyl acrylate, and mixtures thereof. Of these, isooctyl acrylate and 2-ethylhexyl acrylate are the most preferred.

Also useful for providing the base monomer are monofunctional, unsaturated vinyl esters derived from linear or branched carboxylic acids having 1 to 14 (preferably 7 to 12) carbon atoms (not counting the carboxyl carbon atom). Suitable vinyl ester monomers include vinyl propionate, vinyl pelargonate, vinyl hexanoate, vinyl caprate, vinyl 2-ethylhexanoate, vinyl octanoate, vinyl decanoate, vinyl laurate, and mixtures thereof. Particularly preferred are vinyl caprate, vinyl 2-ethylhexanoate, vinyl laurate, and mixtures thereof.

(Meth)acrylate or other vinyl monomers which, as homopolymers, have glass transition temperatures higher than about $-20°$ to $0°$ C., e.g., ethyl acrylate, tert-butyl acrylate, isobornyl acrylate, butyl methacrylate, vinyl acetate, acrylonitrile, mixtures thereof, and the like, may be used in conjunction with one or more of the (meth)acrylate and vinyl ester monomers provided that the glass transition temperature of the resulting polymer is below about $-10°$ C. and has pressure sensitive adhesive properties.

Advantageously, the pressure sensitive adhesive microparticles of the invention may be prepared without polar monomers. That is, the microparticles may be prepared using: alkyl (meth)acrylate and/or vinyl ester base monomer (s), alone or in combination only with other free-radically polymerizable vinyl functional base monomers; and carbonyl monomers. Polar monomers can lead to a corrosive interaction with metal substrates and can render the resulting adhesive more sensitive to moisture (e.g., loss of adhesion in high humidity environments).

However, polar monomers may be beneficial in some instances. Consequently, the pressure sensitive adhesives of the invention may further and optionally comprise a polar monomer different than but copolymerizable with the carbonyl monomer and the base monomer. The polar monomer may be added to improve or modify cohesive strength, storage stability, adhesion to polar surfaces, and glass transition temperature. It is preferred that the polar monomer be incorporated in an amount of no more than about 1 to 20 parts by weight, if it is used at all.

Polar monomers refer to monomers that are both oil and water soluble, are polymerizable with but different than the carbonyl monomer and the base monomer, and include one of the following polar substituents: amide, nitrile, hydroxyl and carboxylic acid (including acid salt) groups. Suitable polar monomers include monoolefinic monocarboxylic acids, monoolefinic dicarboxylic acids, salts thereof, acrylamides, N-substituted acrylamides, N-vinyl lactams, and mixtures thereof. Representative examples of these classes of useful polar monomers include acrylic acid, methacrylic acid, itaconic acid, crotonic acid, maleic acid, fumaric acid, sulfoethyl methacrylate, N-vinyl pyrrolidone, N-vinyl caprolactam, acrylamide, t-butyl acrylamide, dimethylamino ethyl acrylamide, N-octyl acrylamide, hydroxy ethyl acrylate, and hydroxy ethyl methacrylate. Ionic monomers such as sodium methacrylate, ammonium acrylate, sodium acrylate, trimethylamine p-vinyl benzimide, N,N-dimethyl-N-(beta-methoxy-ethyl) ammonium propionate betaine, trimethylamine methacrylamide, 1,1-dimethyl-1-(2,3-dihydroxypropyl)amine methacrylamide, and mixtures thereof are also useful. Particularly preferred are acrylic acid, sodium acrylate, N-vinyl pyrrolidone, and mixtures thereof.

The pressure sensitive adhesive microparticles of the invention preferably comprise: (a) about 0.1 to 10 parts by weight carbonyl monomer; (b) about 75 to 99.9 parts by weight base monomer; and, optionally, (c) 0 to about 20 parts by weight polar monomer. More preferably, the pressure sensitive adhesive microparticles comprise: (a) about 0.5 to 7.0 parts by weight carbonyl monomer; (b) about 80 to 98 parts by weight base monomer; and, optionally, (c) 0 to about 15 parts by weight polar monomer. Most preferably, the pressure sensitive adhesive microparticles comprise: (a) about 1.0 to 5.0 parts by weight carbonyl monomer; (b) about 85 to 98 parts by weight base monomer, and, optionally, (c) 0 to about 10 parts by weight polar monomer. The parts by weight ranges are based on the sum of (a)+(b)+(c) nominally equalling 100 parts.

The pressure sensitive adhesive microparticles of the invention may also contain a multifunctional free-radically polymerizable crosslinking agent. Such crosslinking agents can enhance the cohesive strength and solvent insolubility of the individual microparticles by internally crosslinking them. "Multifunctional" refers to crosslinking agents which possess two or more free-radically polymerizable olefinically unsaturated groups. Useful multifunctional crosslinking agents include (meth)acrylic esters of diols (e.g., butanediol), triols (e.g., glycerol), and tetrols (e.g., pentaerythritol); polymeric multifunctional (meth)acrylates (e.g., poly(ethylene oxide) diacrylate and poly(ethylene oxide) dimethacrylate); polyvinylic compounds (e.g., substituted and unsubstituted divinylbenzene); difunctional urethane acrylates; and mixtures thereof.

When an internal crosslinking agent is employed, it is typically used at a level of up to about 0.15 equivalent weight percent. Above about 0.15 equivalent weight percent, the microparticles tend to lose their pressure sensitive adhesive qualities and eventually become non-tacky to the touch at room temperature. The "equivalent weight percent" of a given compound is defined as the number of equivalents of that compound divided by the total number of equivalents of free-radically polymerizable unsaturation in the total microparticle composition. An equivalent is the number of grams divided by the equivalent weight. The equivalent weight is defined as the molecular weight divided by the number of polymerizable groups in the monomer (in the case of those monomers with only one polymerizable group, equivalent weight=molecular weight).

Surprisingly and advantageously, it has been found that by incorporating a polyfunctional hydrazide into the pressure sensitive adhesives of the invention, the shear strength of articles made with the adhesives can be dramatically improved as can the solvent resistance of such articles. The polyfunctional hydrazide also significantly reduces the tendency of such articles to transfer adhesive upon repeated attachment to and subsequent removal from a surface.

A polyfunctional hydrazide (sometimes described herein as a polyhydrazide) refers to a compound having more than one hydrazino moiety; i.e, more than one —NH—NH$_2$ moiety. Polyhydrazides are typically obtained as the reaction product of hydrazine and a polyfunctional organic carboxylic acid (or its corresponding ester, amide, acyl halide or anhydride). The polyfunctional organic carboxylic acid may be aliphatic or aromatic in nature and may contain a branched or linear backbone. Preferably, the acid is a dicarboxylic acid so as to result in a polyhydrazide having the following general structure:

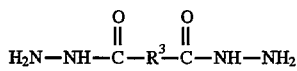

wherein $R^3$ is an organic radical containing about 2 to 10 carbon atoms. As the molecular weight and size of the $R^3$ group increases, the solubility of the polyhydrazide in water declines.

The polyhydrazide may also be provided by a poly (acrylhydrazide) which is typically obtained by reacting a polymer of a polyfunctional organic carboxylic acid (or its corresponding ester, amide, acyl halide or anhydride) with hydrazine. Also useful are bis-semicarbizides, especially those which are aliphatic or cycloaliphatic and have the following general structure:

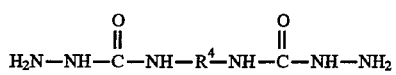

wherein $R^4$ is a straight chain or branched radical having 2 to 7 carbon atoms or a cycloaliphatic radical having 6 to 8 carbon atoms.

Examples of useful polyhydrazides include oxalyl dihydrazide, malonyl dihydrazide, succinyl dihydrazide, glutaryl dihydrazide, adipoyl dihydrazide, maleyl dihydrazide, sebacoyl dihydrazide, fumaroyl dihydrazide, isophthalic dihydrazide, terephthalic dihydrazide, and mixtures thereof. Particularly preferred polyhydrazides include malonyl dihydrazide and adipoyl dihydrazide.

Broadly, the polyhydrazide is used in an amount of about 0.5 to 150 milliequivalents (meq) per 100 grams of pressure sensitive adhesive microparticle (the microparticle being the polymerization product of the carbonyl monomer, the base monomer, and any optional polar monomer). The number of milliequivalents is equal to the number of equivalents of hydrazine functionality multiplied by 1000, and the number of equivalents is the multiplication product of the number of moles of polyhydrazide and the functionality of the polyhydrazide. If the amount of polyhydrazide is less than about 0.5 meq, then the level of interparticle crosslinking is reduced and the pressure sensitive adhesive microparticles exhibit lower shear strength and have a higher tendency toward adhesive transfer. If the amount of polyhydrazide is greater than about 150 meq, then the microparticles are more highly crosslinked and show less pressure sensitive adhesive properties. More preferred is to use about 1 to 100 meq of the polyhydrazide. Most preferred is a level of about 2 to 50 meq.

The pressure sensitive adhesive microparticles of the invention may be prepared by a variety of different methods all of which rely on suspension polymerization of the microparticles. The resulting microparticles tend to be bead or pearl shaped, although they may more spheroidal. Typically, they have an average diameter of about 1 to 300 µm (more preferably, about 1 to 50 µm). The microparticles may be solid or hollow. Hollow microparticles contain one or more voids; i.e., one or more spaces completely within the walls of a polymerized microparticle. Typically, the hollow portion is less than 100 µm in average diameter.

If hollow microparticles are desired they may be obtained via a "two-step" process comprising the steps of:

(a) forming a water-in-oil emulsion by mixing (1) an aqueous solution (which may contain some of the carbonyl monomer and/or some of the optional polar monomer) with (2) oil phase base monomers, a free radical polymerization initiator, and internal crosslinking agent (if any is used);

(b) forming a water-in-oil-in-water emulsion by dispersing the water-in-oil emulsion from step (a) into an aqueous phase (containing any of the carbonyl monomer and/or polar monomer not added in step (a)); and (c) initiating suspension polymerization, usually by applying heat (preferably about 40° to 60° C., more preferably about 50° to 60° C.) or radiation (e.g., ultraviolet radiation).

Emulsifiers having a low hydrophilic-lipophilic balance (HLB) value are used to facilitate the formation (usually by agitation) of the water-in-oil emulsion in the first step. Suitable emulsifiers are those having an HLB value below about 7, preferably in the range of about 2 to 7. Examples of such emulsifiers include sorbitan monooleate, sorbitan trioleate, and ethoxylated oleyl alcohol such as Brij™ 93, available from Atlas Chemical Industries, Inc. A thickening agent, e.g., methyl cellulose, may also be included in the aqueous phase of the water-in-oil emulsion.

The aqueous phase into which the water-in-oil emulsion is dispersed in step (b) contains an emulsifier having an HLB value above about 7. Examples of such emulsifiers include ethoxylated sorbitan monooleate, ethoxylated lauryl alcohol, and alkyl sulfates. The emulsifier concentration (for both steps (a) and (b)) should be greater than its critical micelle concentration, which refers to the minimum concentration of emulsifier necessary for the formation of micelles, i.e., submicroscopic aggregations of emulsifier molecules. Critical micelle concentration is slightly different for each emulsifier, usable concentrations ranging from about 1.0× $10^{-4}$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy, & Biology*, (D. Attwood and A. T. Florence, Chapman & Hall Limited, New York, 1983).

Useful initiators are those which are normally suitable for free radical polymerization of acrylate or vinyl ester monomers and which are oil soluble and of very low solubility in water, typically less than 1 g/100 g water at 20° C. Examples of such initiators include azo compounds, hydroperoxides, peroxides, and the like, and photoinitiators such as benzophenone, benzoin ethyl ether, 2,2-dimethoxy-2-phenyl acetophenone. The initiator is generally used in an amount ranging from about 0.01 percent up to about 10 percent by weight of the total polymerizable composition, preferably up to about 5 percent.

Use of a substantially water soluble polymerization initiator, such as those generally used in emulsion polymerizations, causes formation of substantial amounts of latex. During suspension polymerization, any significant formation of latex is undesirable because of the extremely small particle size.

Hollow microparticles may also be prepared by a simpler "one-step" process comprising aqueous suspension polymerization of the carbonyl monomer, the base monomer, and the polar monomer (which is not optional for this process) in the presence of an emulsifier which is capable of producing, inside the droplets, a water-in-oil emulsion that is substantially stable during both formation of the emulsion and subsequent suspension polymerization.

Useful emulsifiers are anionic materials having an HLB value greater than 25 and include alkylaryl ether sulfates such as sodium alkylaryl ether sulfate, e.g., Triton™ W/30, available from Rohm and Haas; alkylaryl poly(ether) sulfates such as alkylaryl poly(ethylene oxide) sulfates, preferably those having up to about 4 ethoxy repeat units; and alkyl sulfates, such as sodium lauryl sulfate, ammonium lauryl sulfate, triethanolamine lauryl sulfate, and sodium hexadecyl sulfate; alkyl ether sulfates such as ammonium lauryl ether sulfate; and alkyl poly(ether) sulfates, such as alkyl poly(ethylene oxide) sulfates, preferably those having up to about 4 ethoxy units. Alkyl sulfates; alkyl ether sulfates; alkylaryl ether sulfates; and mixtures thereof are preferred.

Nonionic emulsifiers having an HLB value of between about 13 and 25 can be utilized in conjunction with the anionic emulsifiers. Examples of non-ionic emulsifiers include Siponic™ Y-500-70 (ethoxylated oleyl alcohol, available from Alcolac, Inc.), PLURONIC® P103, and Tween™-40 (from ICI America) As in the two-step process, the emulsifier is utilized in a concentration greater than its critical micelle concentration. Polymeric stabilizers may also be present but are not necessary.

The above-described one-step method may be varied by combining the base monomer with nonionic emulsifiers, oil soluble polymerization initiator, and any multifunctional internal crosslinker before the base monomer is added to the aqueous phase containing a carbonyl monomer, emulsifier and any optional polar monomer. (The polar monomer is optional for this process.) The resulting emulsion is suspension polymerized to yield hollow pressure sensitive adhesive microparticles. Anionic emulsifiers with an HLB value greater than 7 may be included in the aqueous phase to stabilize the system during suspension polymerization but are not required.

Solid pressure sensitive adhesive microparticles may be prepared via the suspension polymerizations disclosed in U.S. Pat. Nos. 3,691,140; 4,166,152; and 4,636,432. In general, these suspension polymerization techniques use ionic or nonionic emulsifiers in an amount greater than the critical micelle concentration and/or protective colloids, finely divided inorganic solids, or the like.

Each suspension polymerization method (whether producing hollow or solid microparticles) may be modified by withholding the addition of all or some of the carbonyl monomer and/or any optional polar monomer until after polymerization of the oil phase base monomer has been initiated. In this instance, however, these components must be added to the polymerizing mixture prior to 100% conversion of the base monomer. Similarly, the internal crosslinker (if used) can be added at any time before 100% conversion to polymer of the monomers of the microparticle composition. Preferably it is added before initiation occurs.

Once the pressure sensitive adhesive microparticles have been suspension polymerized, but while they are still dispersed in the aqueous suspension media, the polyhydrazide may be added either as an aqueous solution or as a solid powder that dissolves in the aqueous suspension media.

Other ingredients which may be optionally added to the microparticle suspension following polymerization include tackifying resins, plasticizers, pigments, neutralizing agents (e.g., sodium hydroxide), fillers, stabilizers, and various polymeric additives. These ingredients are incorporated in amounts that do not materially adversely affect the desired properties of the pressure sensitive adhesive microparticles.

Following suspension polymerization, an aqueous suspension of the pressure sensitive adhesive microparticles is obtained. The suspension may have a non-volatile solids contents of from about 10 to 50 percent by weight. However, as explained more fully hereinbelow, the properties of the pressure sensitive adhesive microparticles will be different depending on whether a polyhydrazide has been included.

If the microparticles were prepared without polyhydrazide, then the aqueous suspension of microparticles may be sprayed by conventional techniques without cobwebbing, or they may be sprayed from an aerosol container with suitable propellants such as alkanes, alkenes, and chlorofluorocarbons (e.g., Freon™ halocarbons from E.I. dupont de Nemours & Co., Inc.). Useful aerosols preferably have a solids content of about 5% to 20%, more preferably about 10% to 16%.

The aqueous suspension may also be coated onto an appropriate substrate and dried. Drying may be accomplished under ambient conditions or, more quickly, by heating for about 3 to 20 minutes in a 60° to 110° C. oven, the actual time and temperature depending on the substrate. (For systems containing a poly(acylhydrazide) external crosslinker, heated drying is required.)

Alternatively, the aqueous suspension of pressure sensitive adhesive microparticles may be dried and then redispersed (with agitation if necessary) in common organic liquid solvents such as ethyl acetate, tetrahydrofuran, heptane, 2-butanone, benzene, and cyclohexane. The solvent dispersions may be sprayed or they may be coated onto a suitable backing and dried. However, once the microparticles have been dried, they cannot be redispersed in water.

If the pressure sensitive adhesive microparticles have been prepared with polyhydrazide, then the aqueous suspension of microparticles may be sprayed by conventional techniques without cobwebbing or they may be sprayed from an aerosol container, as describe above. In addition, the aqueous suspension may be coated onto an appropriate substrate and dried, as described above. However, once these microspheres have been dried, they can no longer be redispersed, either in water or common organic liquid solvents. Thus, the dried pressure sensitive adhesive microparticles of the invention that include polyhydrazide may be regarded as solvent indispersible.

While not wishing to be bound by any particular theory, it is believed that the polyhydrazide is essentially unreactive toward the microparticles in suspension. However, as the water is removed from the suspension upon drying, a dehydration condensation reaction occurs between the carbonyl groups provided in the microparticles by the carbonyl monomer and the hydrazino moieties. In preferred systems, this reaction proceeds at a high rate under ambient conditions and forms covalent linkages between microparticles. In this way, the pressure sensitive adhesive microparticles may be regarded as interpartically or externally crosslinked.

The inert nature of the polyhydrazide when in suspension, coupled with its ability to rapidly form interparticle covalent crosslinks between microparticles when the water is removed, offers a number of important advantages, as explained below.

As noted above, the pressure sensitive adhesive microparticles of the invention may be coated onto a suitable substrate. Useful substrates include paper, plastic films, cellulose acetate, ethyl cellulose, woven or nonwoven fabric formed of synthetic or natural materials, metal, metallized plastic films, and ceramic sheets. Coating can be accomplished with a knife coater, Meyer bar coater, or an extrusion die. In this manner, a wide variety of useful articles may be provided.

For example, a tape or a sheet which includes a flexible backing or substrate, the pressure sensitive adhesive of the invention on one major surface of the substrate, and a low adhesion backsize or release coating (e.g., silicones and fluorosilicones) on the opposite major surface of the substrate can be made. The tape or sheet can be wound convolutely about itself on a core to form a sheet roll or a roll of tape. Alternatively, the pressure sensitive adhesive can be applied to both major surfaces of the substrate so as to provide a double coated tape or sheet. The invention further provides a tape comprising a flexible substrate, the pressure sensitive adhesive on one major surface of the substrate, and a protective release liner over the exposed pressure sensitive adhesive surface. A transfer tape comprising a film of the pressure sensitive adhesive between two release liners can also be made.

Because the pressure sensitive adhesives of the invention display excellent resistance to non-polar organic liquid solvents, they would be particularly desirable in providing tapes for use in environments where exposure to motor vehicle fuel is of concern, such as a fuel hose tape.

The invention will be more fully appreciated with reference to the following examples which should not be viewed as limiting in scope.

Abbreviations and Tradenames

Various abbreviations and tradenames are used in the examples which are defined according to the following schedule:

AA acrylic acid
ABVN 2,2'-azobis(2,4-dimethylvaleronitrile) polymerization initiator
ACL acrolein
ADH adipoyl dihydrazide
BA n-butyl acrylate
BDA 1,4 butanediol diacrylate
Brij™-92 polyoxyethylene (2) oleyl ether, available from Atlas Chemical Industries
DAACM diacetone acrylamide
EA ethyl acrylate
2EHA 2-ethylhexyl acrylate
HDDA 1,6 hexanediol diacrylate
INA isononyl acrylate
IOA isooctyl acrylate
Lucidol™-70 70% benzoyl peroxide polymerization initiator, available from Atochem North America
MDH malonyl dihydrazide
NaAA sodium salt of acrylic acid
NVP N-vinyl pyrrolidone
Pluronic™ F-68 nonionic surfactant block copolymer of propylene oxide and ethylene oxide, available from BASF
Pluronic™ L-81 nonionic surfactant block copolymer of propylene oxide and ethylene oxide, available from BASF
Siponate™ DS-10 sodium dodecylbenzenesulfonate anionic surfactant, available from Alcolac
Standapol™ A ammonium lauryl sulfate surfactant, available from Henkel Corporation
Tween™-40 polyoxyethylene (20) sorbitan monopalmitate nonionic surfactant, available from ICI America
VEH vinyl 2-ethylhexanoate
VOAc vinyl acetate
X-linker crosslinker In the examples, the parenthetical information accompanying the example number provides a summary description of the composition formed in that example. The abbreviations are defined by the above schedule. The corresponding numbers state the relative amounts of each ingredient in parts by weight where the carbonyl monomer, the base monomer, and any optional polar monomer nominally sum to 100 parts. Thus, example 1 describes the preparation of pressure sensitive adhesive microparticles comprising 98 parts by weight isooctyl acrylate, 2 parts by weight diacetone acrylamide, and 0.025 part by weight 1,4-butanediol diacrylate.

EXAMPLES

Example 1 (98:2:0.025 IOA/DAACM/BDA)

A 1 liter indented glass flask was charged with 450 ml of deionized water and 5.36 g of Standapol™-A surfactant. The aqueous solution was stirred at 450 RPM and heated to 70° C. A monomer formulation composed of 147 g of IOA, 3 g of DAACM, and 0.0375 g of BDA was prepared. 0.643 g of Lucidol™-70 was added to the monomer mix. All ingredients were then added to the hot aqueous solution and the temperature was reduced to 65° C. The flask was degassed with argon and allowed to react for 3 hours. Upon cooling, a suspension of solid, tacky, acrylate microparticles was obtained with a volume average diameter of 54 µm.

Example 2 (79:20:1 2EHA/NVP/DAACM)

The polymerization procedure was similar to Example 1 except that the monomer formulation was 118.5 g 2EHA, 30.0 g NVP, and 1.5 g DAACM. 0.45 g of ABVN polymerization initiator was used to suspension polymerize at 45° C. for 5 hours. Upon cooling, a suspension of solid, tacky acrylate microparticles was obtained with a volume average diameter of 90 µm.

Example 3 (99.9:0.1 IOA/DAACM)

The polymerization procedure was similar to Example 1 except that the monomer formulation was 149.85 g IOA and 0.15 g DAACM. The suspension polymerization was continued for 5 hours. Upon cooling, a suspension of solid, tacky acrylate microparticles was obtained with a volume average diameter of 58 µm.

Example 4 (90:10 IOA/DAACM)

The polymerization procedure was similar to Example 1 except that the monomer formulation was 135 g IOA and 15.0 g DAACM. The suspension polymerization was continued for 5 hours. Upon cooling, a suspension of solid, tacky acrylate microparticles was obtained with a volume average diameter of 65 µm.

Example 5 (98:2:0.025 IOA/DAACM/BDA)

A 1 liter indented glass flask was charged with 450 ml of deionized water, 3 g of DAACM, and 1.79 g of Standapol™-A. The aqueous solution was stirred at 450 RPM and heated to 70° C. Next 147 g of IOA, 4 g of Tween™-40, 0.0375 g of BDA, and 0.643 g of Lucidol™-70 were added to the hot aqueous solution and the temperature was reduced to 65° C. The flask was degassed with argon and the contents were allowed to suspension polymerize for 5 hours. Upon cooling, a suspension of hollow, tacky, acrylate microparticles was obtained with a volume average diameter of 38 µm.

Example 6 (98:1:1 IOA/AA/DAACM)

A 1 liter indented glass flask was charged with 450 ml of deionized water and 5.36 g of Standapol™-A. The aqueous solution was stirred at 450 RPM and heated to 70° C. Next, a monomer formulation composed of 147 g of IOA, 1.5 g of DAACM, and 1.5 g of AA, along with 0.643 g of Lucidol™-70, were added to the hot aqueous solution and the temperature was reduced to 65° C. The flask was degassed with argon and the contents were allowed to suspension polymerize for 15 hours. Upon cooling, a suspension of hollow, tacky, acrylate microparticles was obtained with a volume average diameter of 55 μm.

Example 7 (94:3:3 IOA/VOAc/DAACM)

The polymerization procedure was similar to Example 6 except that the monomer formulation was 197.4 g IOA, 6.3 g VOAc, and 6.3 g DAACM which were emulsified into 390 g of deionized water (35% solids) with 6 g of Standapol™-A. 0.99 g of Lucidol™-70 was used as an initiator. The initiation temperature was 70° C. and the suspension polymerization was allowed to proceed for 8 hours. Upon cooling, a suspension of hollow, tacky, acrylate microparticles was obtained.

Example 8 (98:1:1:0.06 VEH/NVP/DAACM/HDDA)

A water-in-oil emulsion was prepared by dissolving 0.1 g of HDDA, 2 g of NVP, and 0.9 g of Pluronic™L-81 in 152 g of VEH and then by emulsifying 50 g of deionized water with 2 g of DAACM into the above monomer mixture.

A 1 liter indented resin flask was charged with 0.5 g of Pluronic™ F-68, 0.9 g of Brij™-92, and 400 g of deionized water. A water-in-oil-in-water emulsion was then prepared by adding the above water-in-oil emulsion to the flask and agitating at 300 RPM. 0.71 g of Lucidol™-70 was then added to the flask, which was heated to 65° C., degassed with argon, and allowed to suspension polymerize for 20 hours. Upon cooling, a suspension of hollow, tacky microparticles was obtained.

Example 9 (Comparative, 100:0.025 IOA/BDA)

The polymerization procedure was similar to Example 1 except the microparticles were prepared without the DAACM carbonyl monomer. 150 g of IOA and 0.0375 g of BDA were used and the suspension polymerization was run for 5 hours. Upon cooling, a suspension of solid, tacky, acrylate microparticles was obtained with a volume average diameter of 58 μm.

Example 10 (93:5:2 IOA/EA/DAACM)

1.2 g of Siponate™ DS-10 was dissolved in 360 g of deionized water and a monomer pre-mix comprised of 220.8 g of IOA, 12 g of EA, and 4.8 g of DAACM. The mixture was pre-homogenized in a turbine mixer for 10 minutes and then homogenized with a Gaulin homogenizer at 200 kg/cm². The emulsion was charged to a 1 liter indented glass flask with 0.48 g of ABVN initiator. The agitation speed was set to 335 RPM and the reactor was heated to 40° C. The reactor was then degassed with argon to start the polymerization. Following the exotherm, the temperature was increased to 60° C. and kept for 3 hours from the start of the polymerization. Upon cooling, a suspension of solid, tacky, acrylate microparticles was obtained with a volume average diameter of approximately 2 μm.

Examples 11–13 (93:5:2 IOA/EA/DAACM)

These examples illustrate the use of surfactants other than Siponate™ DS-10 to emulsify the monomer in the water before the suspension polymerization. The monomer composition and the method to prepare the microparticles were the same as in Example 10. The surfactants used in these examples are shown in Table 1.

TABLE 1

| Example | Surfactant |
|---|---|
| 11 | 4.6 g Levenol ™ -WZ, sodium polyoxyethylene (20) nonylphenyl ether sulfate from KAO |
| 12 | 9.6 g Demol ™ EP, polymeric surfactant from KAO |
| 13 | 2.4 g Hitenol ™ HS-10 (HS-10), copolymerizable surfactant, from Dai-ichi Kogyo Seiyaku |

Example 14 (89:10:1 2EHA/BA/DAACM)

The polymerization procedure was similar to Example 10 except that the monomer formulation was 106.8 g 2EHA, 12 g BA, and 1.2 g DAACM and that 4.6 g of Levenol™-WZ were used to emulsify into 180 g of deionized water. A suspension of solid, tacky, acrylate microparticles was obtained with a volume average diameter of 2 μm.

Example 15 (99:1 INA/ACL)

The polymerization procedure was similar to Example 10 except that the monomer formulation was 118.8 g of INA, 1.2 g of ACL, and that 4.6 g of Levenol™-WZ were used to emulsify into 180 g of deionized water. A suspension of solid, tacky, acrylate microparticles was obtained with a volume average diameter of 2 μm.

Example 16 (Comparative 85:15 2EHA/DAACM)

The polymerization procedure was similar to Example 10 except that the monomer formulation was 102 g 2EHA and 18 g DAACM and that 4.6 g of Levenol™-WZ was used to emulsify into 180 g of deionized water. A suspension of solid, acrylate microparticles was obtained with a volume average diameter of 2 μm.

Example 17 (Comparative 98:1:1 IOA/AA/DAACM)

A 0.5 liter indented glass flask was charged with 122 ml of deionized water, 3.57 g of Standapol™-A, 98.0 g of IOA, 1.0 g of DAACM, 1.0 g of AA, and 0.167 g of ammonium persulfate, a water soluble emulsion polymerization initiator. The emulsion was stirred at 250 RPM and heated to 60° C. The flask was degassed with argon and the contents were allowed to emulsion polymerize for 3 hours. Upon cooling, an emulsion of tacky, acrylate polymer was obtained with a volume average particle size of 0.1 μm. Example 17 is compositionally the same as Example 6. However, it was prepared by emulsion polymerization rather than suspension polymerization. Consequently, it uses an emulsion polymerization initiator rather than the suspension polymerization initiator of Example 6.

Example 18 (Comparative, 99:1 IOA/NaAA)

The polymerization procedure was similar to Example 1 except that the monomer formulation was 148.5 g IOA and 1.5 grams AA (which was neutralized with sodium hydroxide to pH 7 before polymerization) and the reaction was continued for 12 hours. Upon cooling, a suspension of solid, tacky acrylate microparticles was obtained with a volume average diameter of 43 μm.

Example 19 (Comparative, 99:1:0.025 IOA/AA/BDA)

The polymerization procedure was similar to Example 1 except that the monomer formulation was 148.5 g IOA, 1.5 g AA and 0.0375 g BDA. The reaction was continued for 5 hours. Upon cooling, a suspension of hollow, tacky acrylate microparticles was obtained with a volume average diameter of 52 µm.

Example 20 (93:5:2:0.1 IOA/EA/DAACM/HDDA)

The polymerization procedure was similar to Example 11 except that 0.24 g of HDDA was added to the monomer formulation. Upon cooling, a suspension of solid, tacky acrylate microparticles was obtained with a volume average diameter of 1.5 µm.

Example 21 (Comparative, 90:10 IOA/DAACM)

The polymerization procedure was similar to Example 17 except that the monomer formulation was 90 g IOA and 10 g DAACM. Upon cooling, an emulsion of tacky acrylate polymer was obtained with a volume average particle size of 0.1 µm.

Example 22 (Comparative, 98:2:0.025 IOA/DAACM/BDA)

The polymerization procedure was similar to Example 17 except that the monomer formulation was 98 g of IOA, 2 g of DAACM and 0.025 g of BDA. Upon cooling, an emulsion of tacky acrylate polymer was obtained with a volume average particle size of 0.1 µm.

Example 23 (Comparative, 79:20:1 2EHA/NVP/DAACM)

The polymerization procedure was similar to Example 17 except that the monomer formulation was 79 g 2EHA, 20 g NVP, and 1 g DAACM. Upon cooling, an emulsion of tacky acrylate polymer was obtained with a volume average particle size of 0.1 µm.

Some of the foregoing examples were evaluated to determine whether they could be externally or interpartically crosslinked. Evidence for external or interparticle crosslinking can be obtained by attempting to disperse air dried lumps of the microparticles in heptane. Microparticles that have been externally crosslinked will not disperse; microparticles that are not externally crosslinked will disperse. More specifically, Examples 1 to 3, 5, 7 to 10, 18 and 19 were dried with and without the presence of 9.46 meq/100 g of microparticle (0.824 g/100 g of microparticle) of ADH external crosslinker and put into vials of heptane and shaken for 15 hours. The results are shown below in Table 2.

TABLE 2

| Example | Without Crosslinker | With Crosslinker |
|---|---|---|
| 1 | Dispersed (separated spheres) | Swollen but not dispersed |
| 2 | Dispersed (separated spheres) | Swollen but not dispersed |
| 3 | Dispersed (separated spheres) | Swollen but not dispersed |
| 5 | Dispersed (separated spheres) | Swollen but not dispersed |
| 7 | Dispersed (separated spheres) | Swollen but not dispersed |
| 8 | Dispersed (separated spheres) | Swollen but not dispersed |
| 9 | Dispersed (separated spheres) | Dispersed (separated spheres) |
| 10 | Dispersed (separated spheres) | Swollen but not dispersed |
| 18 | Dispersed (separated spheres) | Dispersed (separated spheres) |
| 19 | Dispersed (separated spheres) | Dispersed (separated spheres) |

Table 2 shows that without the presence of the added, external crosslinker, the microparticles from Examples 1 to 3, 5, 7 to 9, 18 and 19 dispersed in heptane. Example 10 appeared to be a transparent, viscous solution because the microparticles were very small and highly swollen. However, the entire material could not be passed through a paper filter indicating that a dispersion rather than a true solution had formed. When the ADH external crosslinker was added, Examples 1 to 3, 5, 7, 8 and 10 did not disperse. The lumps of microparticles remained in tact and did not break up or disperse in the heptane. This can be seen with the naked eye or, for smaller microparticles, through an optical microscope. However, Examples 9, 18 and 19 did disperse since they did not contain a carbonyl monomer.

These examples show that the combined presence of the carbonyl monomer and polyhydrazide external crosslinker results in pressure sensitive adhesive compositions that are indispersible in non-polar organic liquid solvents (e.g. heptane) once dried. As a result, these adhesives have improved resistance to solvents (especially non-polar organic liquid solvents) since the microparticles will not disperse in the solvent.

Preparation of Pressure Sensitive Adhesive Tapes

In the following examples, selected microparticle compositions from Examples 1 to 23 were used to prepare pressure sensitive adhesive tapes.

Example 24

The microparticle suspension of Example 1 was permitted to sit overnight and separate into two phases. The microparticle rich cream (55.7% solids) that rose to the top was isolated. 0.412 g/100 g microparticles of ADH external crosslinker (4.73 meq/100 g microparticle) was added to the cream in the form of a 10% aqueous solution of ADH. A pressure sensitive adhesive tape was prepared by coating this mixture onto 1.5 mils thick primed (with an aminated polybutadiene) polyester film with a knife coater to a 4 mils wet thickness and drying in an oven at 105° C. for 15 minutes. The microparticles were observed with an optical microscope to be continuously coated on the polyester film (i.e., adjacent microparticles touched one another).

Example 25

The microparticle suspension of Example 2 was allowed to sit overnight and separate into two phases. The microparticle rich sediment that settled to the bottom was isolated. 4.73 meq/100 g microparticles of ADH external crosslinker was added to the sediment in the form of a 10% aqueous solution of ADH. A pressure sensitive adhesive tape was prepared as described in Example 24 except that the polyester film was provided with a 10 mils thick wet coat.

Example 26

A pressure sensitive adhesive tape was prepared as described in Example 24 except using the microparticle suspension of Example 3 and 52.0 meq/100 g of microparticles of ADH external crosslinker.

Example 27

A pressure sensitive adhesive tape was prepared as described in Example 24 except using the microparticle suspension of Example 4 and 4.73 meq/100 g of microparticles of ADH external crosslinker.

Example 28

A pressure sensitive adhesive tape was prepared as described in Example 24 except using the microparticle suspension of Example 5 and 4.73 meq/100 g of microparticles of ADH external crosslinker.

Example 29

A pressure sensitive adhesive tape was prepared as described in Example 24 except using the microparticle suspension of Example 6 and 5.77 meq/100 g of microparticles of ADH external crosslinker.

Example 30 (Comparative Example)

A pressure sensitive adhesive tape was prepared as described in Example 24 except using the microparticle suspension of Example 9 and without using any ADH external crosslinker.

Example 31

The microparticle suspension of Example 11 was thickened with 0.2 wt % (based on the weight of the microparticles) of Rheology Modifier QR-708 (Rohm and Haas) and 0.5 g/100 g microparticles of MDH external crosslinker (7.58 meq/100 g polymer) was added. The mixture was coated onto polypropylene film with a knife coater to a wet thickness of 3 mils and dried in an oven at 100° C. for 5 minutes.

Example 32

A pressure sensitive adhesive tape was prepared as described in Example 31 except using the microparticle suspension of Example 13 and 5.74 meq/100 g microparticles of ADH external crosslinker.

Example 33

A pressure sensitive adhesive tape was prepared as described in Example 31 except using the microparticle suspension of Example 14 and 2.87 meq/100 g microparticles of ADH external crosslinker.

Example 34

A pressure sensitive adhesive tape was prepared as described in Example 31 except using the microparticle suspension of Example 15 and 2.87 meq/100 g microparticles of ADH external crosslinker.

Example 35 (Comparative Example)

A tape was prepared as described in Example 31 except using the microparticle suspension of Example 16 and 5.74 meq/100 g microparticles of ADH external crosslinker.

Examples 36 to 40

A series of examples was prepared to evaluate the effect of varying the amount of polyhydrazide external crosslinking agent. More specifically, 0.5 wt % (based on the weight of the microparticles) of UCAR™ Polyphobe™ 104 (Union Carbide) thickener was added to the microparticle suspension of Example 11 and neutralized with $NH_4OH$ to obtain a dispersion having a coatable viscosity. Different levels of ADH crosslinker (see Table 4) were added to the thickened microparticle suspension and the resulting material was coated onto 1.5 mils primed polyester film to a wet thickness of 6 to 8 mils with a knife coater and then dried in an oven at 105° C. for 5 minutes.

Example 41

0.16 g of Carbopol™ 690 (polyacrylic acid thickening agent from BF Goodrich) was dissolved in 50 g of deionized water and the resulting thickener solution was then neutralized with 6% aqueous lithium hydroxide. To the neutralized thickener solution, 12 g of the microparticle suspension (25% solids) of Example 5 (modified with 9.46 meq/100 g microparticles of ADH external crosslinker) and 3.25 g of the microparticle suspension (40% solids) of Example 10 (modified with 9.46 meq/100 g microparticles of ADH external crosslinker) were added. A pressure sensitive adhesive tape was prepared as described in conjunction with Example 24 except that the polyester film was coated to a 3 mils wet thickness.

Example 42 (Comparative Example)

To the neutralized thickener solution in Example 41, 12 g of the microparticle suspension (25% solids) of Example 9 (modified with 9.46 meq/100 g microparticles of ADH external crosslinker) and 3.25 g of the microparticle suspension (40% solids) of Example 10 (modified with 9.46 meq/100 g microparticles of ADH external crosslinker) were added. A pressure sensitive adhesive tape was prepared as described in conjunction with Example 24 except that the polyester film was coated to a 4 mils wet thickness.

Example 43 (Comparative Example)

A pressure sensitive adhesive tape was prepared by adding 5.77 meq/100 g of microparticles of ADH eternal crosslinker to the emulsion of comparative example 17, coating this material onto 1.5 mils primed (with an aminated polybutadiene) polyester film to a wet thickness of 6 mils with a knife coater, and oven drying at 105° C. for 5 minutes.

Example 44

A pressure sensitive adhesive tape was prepared as described in Example 24 but without using any ADH external crosslinker.

Example 45 (Comparative)

A pressure sensitive adhesive tape was prepared as described in Example 24, except using the microparticle suspension of Example 18 and 4.73 meq/100 g microparticles of ADH external crosslinker.

Example 46 (Comparative)

A pressure sensitive adhesive tape was prepared as described in Example 45 but without using any ADH external crosslinker.

Example 47 (Comparative)

A pressure sensitive adhesive tape was prepared as described in Example 28 but without using any ADH external crosslinker.

Example 48 (Comparative)

A pressure sensitive adhesive tape was prepared as described in Example 24, except using the microparticle suspension of Example 19 and 4.73 meq/100 g microparticles of ADH external crosslinker.

Example 49 (Comparative)

A pressure sensitive adhesive tape was prepared as described in Example 48 but without using any ADH external crosslinker.

Example 50

Example 50 was prepared as described in Example 37, except using the microparticle suspension of Example 20.

Example 51 (Comparative)

A pressure sensitive adhesive tape was prepared as described in Example 43, except using the emulsion of Example 21 and 4.73 meq/100 g polymer of ADH external crosslinker.

Example 52 (Comparative)

A pressure sensitive adhesive tape was prepared as described in Example 43, except using the emulsion of Example 22 and 4.73 meq/100 g polymer of ADH external crosslinker.

Example 53 (Comparative)

A pressure sensitive adhesive tape was prepared as described in Example 43, except using the emulsion of Example 23 and 4.73 meq/100 g polymer of ADH external crosslinker.

The tapes of examples 24 to 53 were then evaluated for tack, peel adhesion (to glass and paper), adhesive transfer (to glass and paper), and whether they tore paper upon removal. The test procedures are described below and the results are shown in Table 3. Examples 36 to 40 were further evaluated for shear strength using the test method outlined below. Results are reported in Table 4. Selected examples were evaluated for solvent resistance using the test method outlined below and with the results shown in Table 5.

Test Methods

Tack

The tack of the pressure sensitive adhesive tapes was measured with a Polyken Probe Tack Tester (available from Kendall Company) according to American Society for Testing and Materials Test Method ASTM D2979-88. After cleaning the probe with methyl ethyl ketone using a lint-free cloth, a 2 cm×2 cm sample of the tape was placed on the annular ring weight of the Polyken apparatus. The tack was then measured using a 10 mm stainless steel probe having a diameter of 0.4975 cm with a speed of 1 cm/sec. and a dwell time of 1 sec. The pressure sensitive adhesives of the invention preferably show a probe tack of at least 25 g, more preferably at least 50 g, and most preferably at least 100 g. The tack that is ultimately desirable will depend on the intended use for the adhesive.

Peel Adhesion and Adhesive Transfer

180° peel adhesion of the tapes was measured with a model 3M90 slip/peel tester (Instrumentors, Inc.) according to Test Methods for Pressure Sensitive Tapes, PSTC-1, promulgated by the Pressure Sensitive Tape Council. More specifically, the adhesive surface of a 1 in.×6 in. strip of tape was placed in contact with a glass plate or a piece of paper (plain, 20# white bond paper used in photocopy machines) and rolled down with one pass of a 2 kg roller. The strip of tape was then immediately removed at an angle of 180° to the surface of the glass plate or the piece of paper using a removal speed of 90 in./minute. The force of removal was measured and recorded in oz./inch width. Once the tape had been removed, the adherend surface was observed (visually and by finger touch) to assess whether there had been any adhesive transfer. An observation of no adhesive transfer means that no adhesive residue could be detected on the substrate, either visually or by finger touch. Useful pressure sensitive adhesives should display a peel adhesion of at least 0.3 oz./in., preferably at least 0.5 oz./in. They should also show no adhesive transfer. The ultimately desirable peel adhesion will depend on the intended use for the adhesive.

Also recorded was whether the paper tore upon removal of the tape. Samples were tested twice. A "no" entry indicates that the paper did not tear for either sample. A "yes" entry indicates that the paper tore for both samples. "Sometimes" means that the paper tore once. If the paper tore both times, adhesive transfer to the paper was not evaluated.

Shear Strength

Shear strength was measured in accordance with Test Methods for Pressure Sensitive Tapes, PSTC-7, promulgated by the Pressure Sensitive Tape Council. More specifically, a 0.5 in.×0.5 in. end portion of a tape strip measuring 5 in.×0.5 in. was adhered to a bright, annealed steel test panel and rolled down with six passes of a 2 kg rubber roller. The panel was then mounted in a jig vertically with the 4.5 in. free end of the tape hanging down. A 500 g mass was suspended from the free end of the tape and the time that elapsed until the tape separated from the panel was recorded in minutes. The test was discontinued if separation had not occurred after 10,000 minutes. Preferably, the pressure sensitive adhesives of the invention display a shear strength in excess of 10,000 minutes. The ultimately desirable shear strength will depend on the intended use for the adhesive.

Solvent Resistance

A 1 inch×1 inch sample of tape was immersed in various solvents (heptane, acetone, iso-propyl alcohol (IPA), and water) for 15 hours, removed from the solvent, and dried. The condition of the adhesive layer on the backing was observed with the results shown in Table 5 where a "yes" entry under the particular solvent indicates that sufficient adhesive was retained on the backing for the tape to be used again and where a "no" entry indicates that the adhesive layer was deteriorated by the solvent to the point that the sample was no longer useful as a pressure sensitive adhesive tape.

TABLE 3

| Example | X-linker[1] (meq./ 100 g micro-particles) | Coating Weight (g/m²) | Probe Tack (g) | Adhesion to Glass (oz/in) | Adhesive Transfer to Glass | Adhesion to Paper (oz/in) | Paper Tearing | Adhesive Transfer to Paper |
|---|---|---|---|---|---|---|---|---|
| 24 (98:2:0.025IOA/DAACM/BDA) | 4.73 | 63.0 | 412 | 15.5 | No | 24.2 | No | No |
| 25 (79:20:12EHA/NVP/DAACM) | 4.73 | 106.0 | 502 | 46.0 | No | 46.0 | No | No |
| 26 (99.9:0.1 IOA/DAACM) | 52.0 | 71.1 | 224 | 11.8 | No | 25.7 | No | No |
| 27 (90:10 IOA/DAACM) | 4.73 | 54.9 | 127 | 1.9 | No | 5.9 | No | No |
| 28 (98:2:0.025IOA/DAACM/BDA) | 4.73 | 47.5 | 335 | 4.1 | No | 23.2 | No | No |
| 29 (98:1:1IOA/AA/DAACM) | 5.77 | 44.0 | 241 | 7.2 | No | 8.1 | No | No |
| 30 (100:0.025 IOA/BDA) | — | 57.0 | 356 | 10.3 | Yes | 25.4 | No | Yes |
| 31 (93:5:2IOA/EA/DAACM) | 7.58 | 29.9 | 593 | 30 | No | 27 | No | No |
| 32 (93:5:2:1IOA/EA/DAACM/HS-10) | 5.74 | 27.3 | 488 | 42 | No | 28 | No | No |
| 33 (89:10:12EHA/BA/DAACM) | 2.87 | 32.9 | 523 | 35 | No | 29 | No | No |
| 34 (99:1 INA/ACL) | 2.87 | 28.8 | 405 | 16 | No | 27 | No | No |
| 35 (85:15 2EHA/DAACM) | 5.74 | 22.6 | 0 | 0 | No | 0 | No | No |
| 36 (93:5:2IOA/EA/DAACM) | — | 41.1 | 781 | 40.1 | No | 32.8 | Sometimes | No |
| 37 (93:5:2IOA/EA/DAACM) | 0.5 | 39.6 | 755 | 38.2 | No | 37.1 | Sometimes | No |
| 38 (93:5:2IOA/EA/DAACM) | 10 | 39.2 | 792 | 37.5 | No | 40.2 | No | No |
| 39 (93:5:2IOA/EA/DAACM) | 100 | 33.8 | 142 | 28.5 | No | 0.4 | No | No |
| 40 (93:5:2IOA/EA/DAACM) | 200 | 33.6 | 0 | 0 | No | 0 | No | No |
| 41 | 9.46 | 4.4 | 113 | 1.2 | No | 1.7 | No | No |
| 42 | 9.46 | 3.0 | 96 | 1.2 | Yes | 1.3 | No | Yes |
| 43 (98:1:1IOA/AA/DAACM) | 5.77 | 50.1 | 697 | 29.8 | No | 17.3 | Yes | * |
| 44 (98:2:0.025 IOA/DAACM/BDA) | — | 55.8 | 290 | 14.4 | No | 20.2 | Sometimes | Yes |
| 45 (99:1 IOA/NaAA) | 4.73 | 63.0 | 291 | 8.4 | No | 24.9 | No | Yes |
| 46 (99:1 IOA/NaAA) | — | 69.5 | 256 | 6.1 | No | 23.5 | No | Yes |
| 47 (98:2:0.025 IOA/DAACM/BDA) | — | 54.5 | 300 | 1.1 | No | 12.1 | No | Yes |
| 48 (99:1:0.025 IOA/AA/BDA) | 4.73 | 51.3 | 321 | 13.1 | No | 21.4 | No | No |
| 49 (99:1:0.025 IOA/AA/BDA) | — | 61.7 | 384 | 13.0 | No | 26.3 | No | Sometimes |
| 50 (93:5:2:0.1 IOA/EA/DAACM/HDDA) | 0.5 | 35.6 | 597 | 22.3 | No | 25.6 | No | No |
| 51 (90:10 IOA/DAACM) | 4.73 | 46.9 | 835 | 31.0 | No | 20.1 | Yes | * |

TABLE 3-continued

| Example | X-linker[1] (meq./ 100 g micro-particles) | Coating Weight (g/m$^2$) | Probe Tack (g) | Adhesion to Glass (oz/in) | Adhesive Transfer to Glass | Adhesion to Paper (oz/in) | Paper Tearing | Adhesive Transfer to Paper |
|---|---|---|---|---|---|---|---|---|
| 52 (98:2:0.025 IOA/DAACM/BDA | 4.73 | 46.4 | 558 | 15.6 | No | 10.9 | Yes | * |
| 53 (79:20:1 2EHA/NVP/DAACM) | 4.73 | 50.7 | 1260 | 49.3 | No | 9.5 | Yes | * |

[1]X-linker = polyhydrazide external crosslinking agent
*Observation not made

TABLE 4

| Example | X-linker[1] (meq./100 g polymer) | Shear Holding Time (min.) |
|---|---|---|
| 36 (93:5:2 IOA/EA/DAACM) | — | 161 |
| 37 (93:5:2 IOA/EA/DAACM) | 0.5 | >10,000 |
| 38 (93:5:2 IOA/EA/DAACM) | 10 | >10,000 |
| 39 (93:5:2 IOA/EA/DAACM) | 100 | >10,000 |
| 40 (93:5:2 IOA/EA/DAACM) | 200 | 0 |

[1]X-linker = polyhydrazide external crosslinking agent

TABLE 5

| Example | External Crosslinker Present | Coating Weight (g/m$^2$) | Heptane Resistance | IPA Resistance | Acetone Resistance | Water Resistance |
|---|---|---|---|---|---|---|
| 30 (100:0.025 IOA/BDA) | No | 57.0 | No | No | No | Yes |
| 45 (99:1 IOA/NaAA) | Yes | 63.0 | No | Yes | Yes | Yes |
| 46 (99:1 IOA/NaAA) | No | 69.5 | No | Yes | Yes | Yes |
| 28 (98:2:0.025 IOA/DAACM/BDA) | Yes | 47.5 | Yes | Yes | Yes | Yes |
| 47 (98:2:0.025 IOA/DAACM/BDA) | No | 54.5 | No | No | No | Yes |
| 29 (98:1:1 IOA/AA/DAACM) | Yes | 44.0 | Yes | Yes | Yes | Yes |
| 48 (99:1:0.025 IOA/AA/BDA) | Yes | 51.3 | No | Yes | Yes | Yes |
| 49 (99:1:0.025 IOA/AA/BDA) | No | 61.7 | No | Yes | Yes | Yes |
| 38 (93:5:2 IOA/EA/DAACM) | Yes | 39.2 | Yes | Yes | Yes | Yes |

The examples demonstrate that the combined presence of a carbonyl monomer and a polyhydrazide external crosslinking agent results in removable pressure sensitive adhesives that have reduced adhesive transfer, good adhesion, and solvent resistance. Example 30 which included neither the carbonyl monomer nor the polyhydrazide showed good adhesion and removability but suffered from adhesive transfer. Example 36 which added the carbonyl monomer but lacked the polyhydrazide did not have adhesive transfer but was not removable. See also Examples 24 (carbonyl monomer and external crosslinker) and 44 (carbonyl monomer but no external crosslinker). Example 24 shows reduced adhesive transfer to paper, an important substrate. Similarly, Example 47 (carbonyl monomer but no external crosslinker) shows adhesive transfer to paper while Example 28 (which adds the external crosslinker) does not show adhesive transfer to paper. Example 35 shows that using excess carbonyl monomer results in a material not having pressure sensitive adhesive properties.

Examples 29 and 43 may be compared. Example 29 shows a useful, removable, pressure sensitive adhesive that does not display adhesive transfer. In Example 43 the same composition was emulsion polymerized (rather than suspension polymerized) and a removable adhesive was not obtained. Other example pairs may be similarly compared. See Examples 27 (suspension) and 51 (emulsion), 24 (suspension) and 52 (emulsion), and 25 (suspension) and 53 (emulsion).

Examples 36 to 40 show the effect of varying the amount of polyhydrazide crosslinking agent. Example 36, having no polyhydrazide, exhibited limited shear strength. Example 40, having excess polyhydrazide, showed no shear strength.

Table 5 shows the improved solvent resistance to a broad spectrum of solvents shown by the adhesive compositions that include both the carbonyl monomer and the polyhydrazide external crosslinking agent. Only the pressure sensitive adhesives of the invention demonstrated resistance to heptane, a solvent representative of non-polar organic liquids.

Reasonable variations and modifications are possible within the scope of the foregoing specification without departing from the invention which is defined in the accompanying claims.

The embodiments for which an exclusive property or privilege is claimed are defined as follows:

1. A removable pressure sensitive adhesive comprising:
   (a) pressure sensitive adhesive microparticles that are the suspension polymerization product of:
      (1) a mono-olefinically unsaturated monomer having an aldehyde group or a ketone group; and
      (2) a base monomer;
   (b) a polyhydrazide crosslinking agent for crosslinking the adhesive microparticles together; and
   (c) multifunctional free- radically polymerizable crosslinking agent for internally crosslinking the microparticles.

2. A removable pressure sensitive adhesive according to claim 1 wherein the base monomer is selected from the group consisting of alkyl (meth)acrylate esters, vinyl esters, and mixtures thereof.

3. A removable pressure sensitive adhesive according to claim 1 wherein the base monomer is a monofunctional unsaturated (meth)acrylate ester of a non-tertiary alkyl alcohol, the alkyl group of which has from 4 to 14 carbon atoms.

4. A removable pressure sensitive adhesive according to claim 3 wherein the base monomer is isooctyl acrylate, 2-ethylhexyl acrylate, or n-butyl acrylate.

5. A removable pressure sensitive adhesive according to claim 1 wherein the mono-olefinic unsaturation in monomer (a)(1) is provided by (meth)acrylate, (meth)acrylamide or styryl functionality.

6. A removable pressure sensitive adhesive according to claim 5 wherein monomer (a)(1) is selected from the group consisting of acrolein, vinyl methyl ketone, vinyl ethyl ketone, vinyl isobutyl ketone, diacetone (meth)acrylamide, formylstyrol, diacetone (meth)acrylate, acetonyl acrylate, 2-hydroxypropyl acrylate-acetyl acetate, 1,4-butanediol acrylate-acetyl acetate, and mixtures thereof.

7. A removable pressure sensitive adhesive according to claim 1 wherein monomer (a)(1) comprises about 0.1 to 10 parts by weight, based on the weight of the pressure sensitive adhesive microparticles.

8. A removable pressure sensitive adhesive according to claim 1 wherein the polyhydrazide has the general structure:

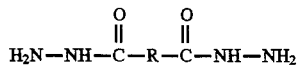

wherein R is an organic radical containing about 2 to 10 carbon atoms.

9. A removable pressure sensitive adhesive according to claim 1 wherein the polyhydrazide is selected from the group consisting of oxalyl dihydrazide, malonyl dihydrazide, succinyl dihydrazide, glutaryl dihydrazide, adipoyl dihydrazide, maleyl dihydrazide, sebacoyl dihydrazide, fumaroyl dihydrazide, isophthalic dihydrazide, terephthalic dihydrazide, and mixtures thereof.

10. A removable pressure sensitive adhesive according to claim 1 wherein the polyhydrazide comprises about 0.5 to 150 milliequivalents per 100 grams of microparticles.

11. A removable pressure sensitive adhesive comprising:
   (a) pressure sensitive adhesive microparticles that are the suspension polymerization product of:
      (1) about 75 to 99.9 parts by weight of a free-radically polymerizable monomer selected from the group consisting of alkyl (meth)acrylate esters, vinyl esters, and mixtures thereof;
      (2) about 0.1 to 10 parts by weight of a mono-olefinically unsaturated monomer having an aldehyde group or a ketone group, each such monomer being independently selected from the group consisting of acrolein, vinyl methyl ketone, vinyl ethyl ketone, vinyl isobutyl ketone, diacetone (meth)acrylamide, formylstyrol, diacetone (meth)acrylate, acetonyl acrylate, 1,4-butanediol acrylate-acetyl acetate, and mixtures thereof; and
      (3) optionally, 0 to about 20 parts by weight of a polar monomer different than monomers (a)(1) and (a)(2);
   wherein the sum of (a)(1)+(a)(2)+(a)(3) is 100 parts by weight; and
   (b) about 0.5 to 150 milliequivalents per 100 grams of microparticles of a polyhydrazide crosslinking agent for crosslinking the adhesive microparticles together.

12. A removable pressure sensitive adhesive according to claim 11 wherein:
   monomer (a)(1) provides about 80 to 98 parts by weight;
   monomer (a) (2) provides about 0.5 to 7 parts by weight;
   monomer (a)(3) provides 0 to about 15 parts by weight.

13. A removable pressure sensitive adhesive according to claim 12 wherein:
   monomer (a)(1) provides about 85 to 98 parts by weight;
   monomer (a) (2) provides about 1 to 5 parts by weight;
   monomer (a)(3) provides 0 to about 10 parts by weight.

14. A removable pressure sensitive adhesive according to claim 11 wherein the polyhydrazide crosslinking agent has the general structure:

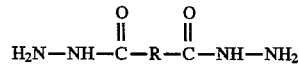

wherein R is an organic radical containing about 2 to 10 carbon atoms.

15. A removable pressure sensitive adhesive according to claim 14 wherein the polyhydrazide is selected from the group consisting of oxalyl dihydrazide, malonyl dihydrazide, succinyl dihydrazide, glutaryl dihydrazide, adipoyl dihydrazide, maleyl dihydrazide, sebacoyl, dihydrazide, fumaroyl dihydrazide, isophthalic dihydrazide, terephthalic dihydrazide, and mixtures thereof.

16. A removable pressure sensitive adhesive according to claim 11 wherein the polyhydrazide crosslinking agent is present in an amount of about 1 to 100 milliequivalents.

17. A removable pressure sensitive adhesive according to claim 16 wherein the polyhydrazide crosslinking agent is present in an amount of about 2 to 50 milliequivalents.

18. A removable pressure sensitive adhesive according to claim 11 further comprising a crosslinking agent for internally crosslinking the microparticles.

19. A removable pressure sensitive adhesive articles comprising a substrate having a pressure sensitive adhesive according to claim 11 on one major surface thereof.

20. A removable pressure sensitive adhesive article according to claim 19 that has a shear strength in excess of 10,000 minutes.

21. A removable pressure sensitive adhesive comprising:
   (a) pressure sensitive adhesive microparticles that are the suspension polymerization product of:
      (1) a mono-olefinically unsaturated monomer having an aldehyde group or a ketone group, and selected from the group consisting of acrolein, vinyl methyl ketone, vinyl ethyl ketone, vinyl isobutyl ketone, diacetone (meth)acrylamide, formylstyrol, diacetone (meth)acrylate, acetonyl acrylate, 1,4-butanediol acrylate-acetyl acetate, and mixtures thereof; and
      (2) a base monomer; and
   (b) a polyhydrazide crosslinking agent for crosslinking the adhesive microparticles together.

22. A removable pressure sensitive adhesive according to claim 21 wherein the base monomer is selected from the group consisting of alkyl (meth)acrylate esters, vinyl esters, and mixtures thereof.

23. A removable pressure sensitive adhesive according to claim 21 wherein the base monomer is a monofunctional unsaturated (meth)acrylate ester of a non-tertiary alkyl alcohol, the alkyl group of which has from 4 to 14 carbon atoms.

24. A removable pressure sensitive adhesive according to claim 23 wherein the base monomer is isooctyl acrylate, 2-ethylhexyl acrylate, or n-butyl acrylate.

25. A removable pressure sensitive adhesive according to claim 21 wherein the mono-olefinic unsaturation in monomer (a)(1) is provided by (meth)acrylate, (meth)acrylamide or styryl functionality.

26. A removable pressure sensitive adhesive according to claim 21 wherein monomer (a)(1) comprises about 0.1 to 10 parts by weight, based on the weight of the pressure sensitive adhesive microparticles.

27. A removable pressure sensitive adhesive according to claim 21 wherein the polyhydrazide has the general structure:

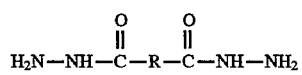

wherein R is an organic radical containing about 2 to 10 carbon atoms.

28. A removable pressure sensitive adhesive according to claim 21 wherein the polyhydrazide is selected from the group consisting of oxalyl dihydrazide, malonyl dihydrazide, succinyl dihydrazide, glutaryl dihydrazide, adipoyl dihydrazide, maleyl dihydrazide, sebacoyl dihydrazide, fumaroyl dihydrazide, isophthalic dihydrazide, terephthalic dihydrazide, and mixtures thereof.

29. A removable pressure sensitive adhesive according to claim 21 wherein the polyhydrazide comprises about 0.5 to 150 milliequivalents per 100 grams of microparticles.

30. A removable pressure sensitive adhesive according to claim 21 further comprising a multifunctional free-radically polymerizable crosslinking agent for internally crosslinking the microparticles.

31. A method of preparing a pressure sensitive adhesive comprising the steps:
   (a) aqueous suspension polymerizing pressure sensitive adhesive microparticles; and
   (b) after step (a), adding to the aqueous suspension of pressure sensitive adhesive microparticles a polyhydrazide crosslinking agent for crosslinking the microparticles together.

32. A method according to claim 31 further comprising the steps:
   (c) applying the aqueous suspension of pressure sensitive adhesive microparticles and crosslinking agent to a backing to form a wet adhesive layer; and
   (d) drying the wet adhesive layer.

33. A method according to claim 32 wherein the dried adhesive layer comprises the pressure sensitive adhesive microparticles crosslinked together.

* * * * *

UNITED STATES PATENT AND TRADEMARK OFFICE
CERTIFICATE OF CORRECTION

PATENT NO.: 5,663,241

DATED: September 2, 1997

INVENTOR(S): Yorinobu Takamatsu, et al.

It is certified that error appears in the above-identified patent and that said Letters Patent is hereby corrected as shown below:

Column 10, line 7, "dupont" should read --duPont--;

Column 14, line 12, under Table 1, under the column Surfactant, Example $_{12}$"Demol™ EP," should read Demol™-EP,--;

Column 15, line 43, "he" should read --be--;

Column 25, line 24, "multifunctionable" should read --a multifunctionable--;

Column 26, line 24, "of(a)(1)" should read --of (a)(1)--;

Column 26, line 53, "sebacoyl, dihydrazide," should read --sebacoyl dihydrazide,--; and Column 26, line 65, " articles " should be --article--.

Signed and Sealed this

Twentieth Day of July, 1999

Attest:

Q. TODD DICKINSON

*Attesting Officer*   Acting Commissioner of Patents and Trademarks